SINGLE CHANNEL STEREOPHONIC SYSTEM

Filed Oct. 20, 1958 2 Sheets-Sheet 1

INVENTOR.
HAROLD B. COLLINS, JR.
BY
Robert D. Sanborn
ATTORNEY

July 10, 1962 H. B. COLLINS, JR 3,043,914

SINGLE CHANNEL STEREOPHONIC SYSTEM

Filed Oct. 20, 1958 2 Sheets-Sheet 2

INVENTOR.
HAROLD B. COLLINS, JR.
BY
Robert D. Sanborn
ATTORNEY

United States Patent Office 3,043,914
Patented July 10, 1962

3,043,914
SINGLE CHANNEL STEREOPHONIC SYSTEM

Harold B. Collins, Jr., Wayne, Pa., assignor, by mesne assignments, to Philco Corporation, Philadelphia, Pa., a corporation of Delaware Filed Oct. 20, 1958, Ser. No. 768,206
12 Claims. (Cl. 179—15)

The present invention relates to radio receiver systems and more particularly to receivers for single carrier, amplitude modulated, signals representing binaural or stereophonic program signals.

It is known that a reproduction at a distance of orchestral performances, operas, stage plays and many other programs is more realistic and enjoyable if the reproducing system provides binaural or stereophonic sound rather than monaural sound from a single speaker system. As is well known, binaural or stereophonic reproduction of a performance requires that the sound be detected at two or more spaced points and played back through two or more spaced reproducers. A distinction is sometimes made between stereophonic and binaural reproduction based on the type and spacing of the audio reproducers employed at the receiving end. Since the present receiver is adaptable for use with either system, the term "binaural reproduction" and "stereophonic reproduction" will be treated as synonymous in this specification. Two information channels are required from the signal pick-ups to the audio reproducers. The frequency restrictions imposed on radio broadcasting stations do not permit dual channel operation of the radio station to carry the two signals necessary for stereophonic broadcasting. Therefore one system employed at the present time to provide stereophonic broadcasts requires sending one channel of the stereophonic broadcast by way of an amplitude modulated radio station while sending the second channel by way of an associated frequency modulated radio station. This system requires a large investment in equipment at the transmitting end and two complete radio receivers at each receiving location. It has the further disadvantage that it is not a truly compatible system in that the entire program cannot be received either on a monaural amplitude modulated receiver or on a frequency modulated receiver.

Systems have been proposed for broadcasting stereophonic signals over a single FM channel. These proposed systems generally require that a subcarrier be added to the FM channel. The second stereophonic information signal modulates this subcarrier. This system also requires relatively expensive equipment at the transmitting end and further requires a complex and expensive receiver at each receiving location.

Systems have been proposed in the past for sending the two stereophonic signals over a single carrier amplitude modulated radio channel with a resultant saving of equipment both at the transmitting station and at each receiving location. In accordance with the teachings of the prior art, two stereophonic program signals may be sent over a single carrier amplitude modulated channel and then separated into their respective audio channels at the receiver by modulating the two program signals on two differently phased carriers which are linearly combined into a single resultant carrier before being transmitted. That is, a signal at the carrier frequency assigned to the station and of a first reference phase is modulated with one combination of the two stereophonic program signals while at the same time a signal of the same carrier frequency but of a second reference phase is modulated with a second combination of the two stereophonic program signals. The two modulated carrier signals are then linearly combined to prevent intermodulation. The combined signal is then broadcast over the channel assigned to that station. At the receiver the two stereophonic program signals are separated by supplying the received signals to two synchronous detector circuits. One synchronous detector circuit is supplied with a reference signal of said first reference phase and frequency and the other synchronous detector circuit is supplied with a reference signal of the same frequency but of the second reference phase.

In many radio broadcasting stations the system just described requires no change in the high power portion of the AM transmitter and only minor changes in the modulating circuits which supply program signals to the transmitter. The single carrier amplitude modulated system just described has the further advantage over the dual station system of stereophonic broadcasting that the entire stereophonic broadcast can be received as a monoaural broadcast on a conventional amplitude modulated receiver. It can be shown that the geographic range of monaural reception of a stereophonic broadcast is substantially the same as a range of reception of a monaural broadcast for the same total power. Also the geographic range of stereophonic reception is substantially the same as the range of monoural reception owing to the greater efficiency of synchronous detectors over the envelope detectors normally employed in commercial amplitude modulated broadcast receivers.

Despite the many obvious advantages of the single carrier amplitude modulated system of stereophonic broadcasting it has not been received with favor by radio broadcasters for the reason that, in the past, it has been difficult and expensive to construct home radio receivers which could generate the necessary demodulating reference signals with the required degree of precision.

Therefore it is an object of the present invention to provide a receiver for single carrier amplitude modulated signals which is inexpensive to manufacture and easy to operate.

Another object of the present invention is to provide an improved receiver for single carrier amplitude modulated reception of two stereophonic signals.

It is a further object of the invention to provide an improved receiver for single carrier, amplitude modulated, multiplex signals which can be readily tuned to different stations.

Still another object of the present invention is to provide a receiver of single carrier, amplitude modulated, stereophonic signals which does not require narrow band filters for carrier signal separation.

A further object of the present invention is to provide a system having a relatively wide pull-in range and a stable lock-in range thereby making the receiver easy to tune.

Still another object of the invention is to provide means for suppressing undesirable audio beat signals which normally occur as a stereophonic receiver is tuned from one station to another.

In general these and other objects of the invention are achieved by employing a superheterodyne receiver which includes two synchronous detector circuits energized by the same intermediate frequency signal and by different reference signals supplied by a reference oscillator circuit. A closed loop phase control circuit responsive to the intermediate frequency information signal and the signal supplied by the reference oscillator is provided for maintaining a fixed relationship between the frequency and phase of the reference oscillator and the frequency and phase of the intermediate frequency information signal. A squelch circuit responsive to a signal supplied by the phase control circuit is employed to suppress undesirable beat frequencies which otherwise would occur in the output of the synchronous detectors as the receiver is tuned from one station to the next.

For a better understanding of the present invention together with other and further objects thereof reference should now be made to the following detailed description which is to be read in conjunction with the accompanying drawings in which.

Figures 1, 1A:
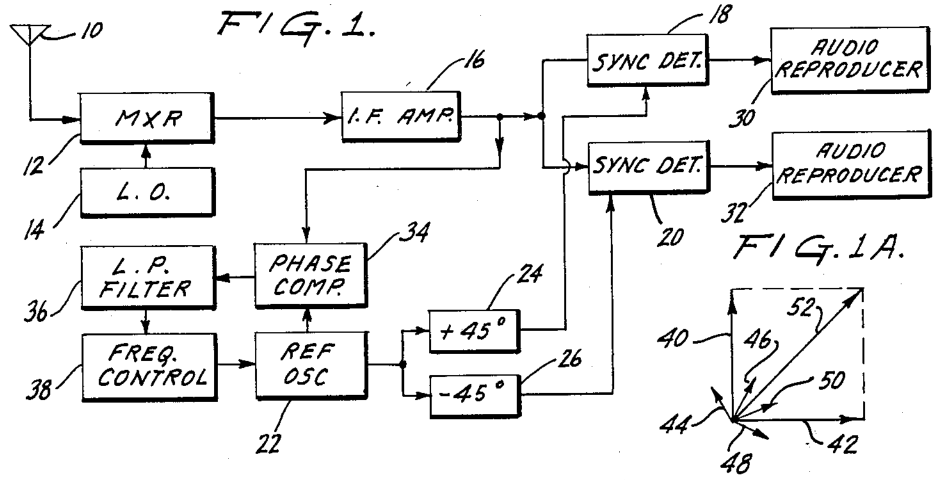
FIG. 1 is a block diagram of one preferred embodiment of the invention.
FIG. 1A is a vector diagram showing the phase relationships of the information signals received by the circuit of FIG. 1.

The portion of the receiver up to and including the intermediate frequency amplifier may take any form suitable for heterodyne reception of a signal. The embodiment of the invention shown in FIG. 1 includes an antenna 10 for receiving the amplitude modulated radio waves, a mixer 12 and a variable frequency local oscillator 14 for heterodyning the received signals to a fixed intermediate frequency. It is desirable that local oscillator 14 be relatively stable in its operation but a moderate amount of drift in frequency of the local oscillator signal will not adversely affect the operation of the circuit. Station selection is achieved by varying the frequency of the local oscillator in the usual fashion. An intermediate frequency amplifier 16 is provided for amplifying the heterodyne signals. The output of intermediate frequency amplifier 16 is supplied to two synchronous detectors 18 and 20. Detectors 18 and 20 are also supplied with demodulating reference signals from a reference oscillator 22. The reference signal is supplied from oscillator 22 to synchronous detector 18 through a phase shifter 24 which, in the particular embodiment chosen for illustration, provides a shift of 45° in the positive direction. The signal is supplied from oscillator 22 to synchronous detector 20 through a phase shifter 26 which provides, in this example, a phase shift of 45° in the negative direction. Therefore the reference signals supplied to detectors 18 and 20 are spaced in phase by 90°. The demodulated signals from detectors 18 and 20 are supplied to audio reproducers 30 and 32, respectively. Each of the audio reproducers 30 and 32 includes an electro-acoustical transducer such as a loudspeaker and may include, in addition, suitable audio amplification circuits and a volume control. The electro-acoustical transducer portions of reproducers 30 and 32 are physically spaced apart to provide the desired binaural or stereophonic effect.

The receiver circuit of FIG. 1 also includes a phase control loop for maintaining a selected phase relationship between the output signal of the intermediate frequency amplifier 16 and the signal from reference oscillator 22. This phase control loop is entirely independent of its synchronous detectors 18 and 20 and hence can be arranged for optimum control of the reference oscillator 22. This phase control loop includes a phase comparator circuit 34 which receives one signal from the output of intermediate frequency amplifier 16 and a second signal from reference oscillator 22. Phase comparator 34 provides an output signal which is representative of the phase difference between the average carrier signal at the output of intermediate frequency amplifier 16 and the signal supplied by reference oscillator 22. Circuits for performing this function are known in the art and one typical circuit which has been found to operate satisfactorily is shown in detail in FIG. 3. The output signal of phase comparator 34 is supplied through a low pass filter 36 to a frequency control circuit 38. Frequency control circuit 38 may be a reactance tube or other form of circuit or circuit element which presents at its output terminals a variable reactance which has a value determined by the amplitude of a signal supplied to the input thereof. The output circuit of frequency control 38 is connected to reference oscillator 22 in a manner to control the phase and frequency of oscillator 22. One preferred form of frequency control circuit is shown in detail in FIG. 3.

The circuit shown in FIG. 1 includes all the elements necessary for the reception of single carrier amplitude modulated multiplex signals. However it does not include circuits for suppressing the audio beat note which may occur as the receiver is tuned from one station to the next. This beat note occurs only at the instant that the reference oscillator is being locked in phase with the intermediate frequency signal and disappears completely once the phase control loop has established the proper phase relationship. Therefore it may be tolerated in low cost receivers.

Figure 2:
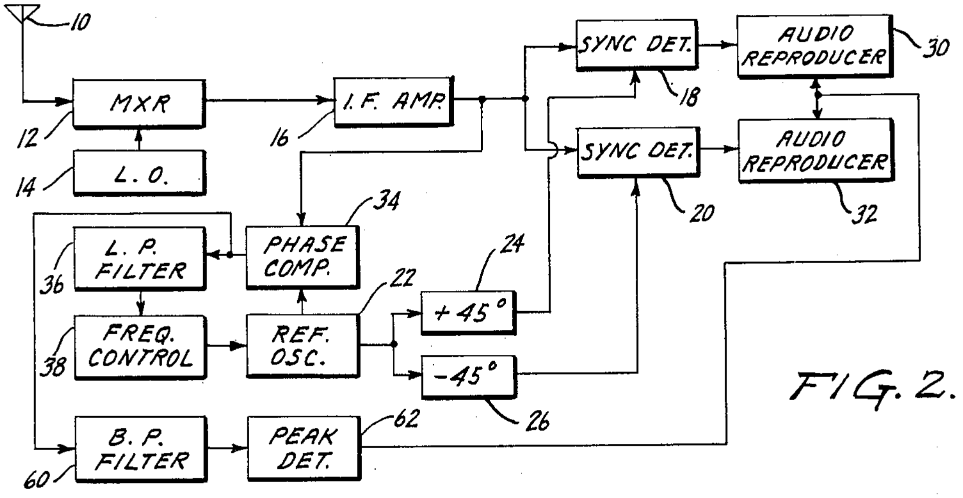
FIG. 2 is a block diagram of an embodiment of the invention similar to that shown in FIG. 1 which incorporates a squelch circuit.

The embodiment of the invention shown in FIG. 2 is similar to the one shown in FIG. 1 except that a squelch circuit has been added for suppressing the audio beat note that normally occurs as the receiver is tuned from one station to another. Parts in FIG. 2 corresponding to like parts in FIG. 1 have been identified by the same reference numeral. The squelch circuit of FIG. 2 comprises a bandpass filter 60 which connects the output of phase comparator 34 to the input of a peak detector 62. The output of peak detector 62 is supplied by means of connection 64 to appropriate points in the audio reproducers 30 and 32.

Since the addition of the squelch circuit does not alter the basic mode of operation of the circuit of FIG. 1, the operation of the circuits of FIGS. 1 and 2 will be described together. In order to understand the operation of the circuits of FIGS. 1 and 2 it is first necessary to understand the nature of the single carrier amplitude modulated multiplex signals to be received by these circuits. FIG. 1A is a vector diagram showing the signal components which make up this signal. Vectors 40 and 42 represent the two reference carrier signals which are generated at the transmitter. Associated with carrier 40 are the sidebands 44 and 46 representing one stereophonic information signal. For reasons which need not be described herein sidebands 44 and 46 may represent the signal from one microphone or other signal pick-up or they may represent a particular matrixed combination of the signals from both stereophonic pick-ups. Sidebands 48 and 50 associated with carrier signal 42 represent the second stereophonic information signal. The linear combination of carrier signal 40 and associated sidebands 44 and 46 with carrier signal 42 and associated sidebands 48 and 50 will produce a single resultant carrier signal 52 having associated therewith the four sidebands shown in FIG. 1A. If carrier signals 40 and 42 are of equal amplitude and 90° apart in phase, the resultant carrier signal 52 will lag 45°. It should be understood that signals 40 and 42 do not appear as such in the received signal. These two signals are represented by the single resultant carrier signal 52. It will be obvious to those familiar with superheterodyne receiver circuits that the vector diagram of FIG. 1A also represents the phase relationships which exist at the output of intermediate frequency amplifier 16 in FIG. 1.

The circuits of FIGS. 1 and 2 operate in the following manner. The frequency of local oscillator 14 is adjusted so that the radio frequency signal picked up by antenna 10 is heterodyned to a frequency that will be passed by amplifier 16. Phase comparator 34, acting through low pass filter 36 and frequency control 38, causes reference oscillator 22 to have a phase and frequency corresponding to the average carrier signal at the output of intermediate frequency amplifier 16. As explained above, this average carrier signal has a phase represented by vector 52 in FIG. 1A. Phase shifter 24 will shift the phase of the reference signal supplied to detector 18 so that it is in phase with vector 42. Since the reference phase supplied to detector 18 is in phase with vector 40 and 90° out of phase with vector 42, the output signal from detector 18 will be an audio frequency signal representing the information contained in the sidebands 44 and 46. This audio frequency signal is supplied to audio reproducer 30 and appears as an acoustical signal from this reproducer. Those familiar with the operation of synchronous detectors will understand that sidebands 48 and 50 will produce no output from synchronous detector 18 since any signal component produced by sideband 48, for example, will be in phase opposition to a corresponding signal component produced by the sideband 50.

The signal supplied from reference oscillator 22 to synchronous detector 20 will be shifted in phase by phase shifter 26 so that it is in phase with the reference carrier 42 of FIG. 1A. As a result, detector 20 will provide an output signal representing the information contained in sidebands 48 and 50. Audio reproducer 32 generates acoustical waves representing the audio frequency signals supplied thereto. Reproducers 30 and 32 are spaced apart to produce the desired stereophonic effect. In a typical example, in an average size room, reproducers 30 and 32 may be spaced from 6 to 8 feet apart.

Figure 3:
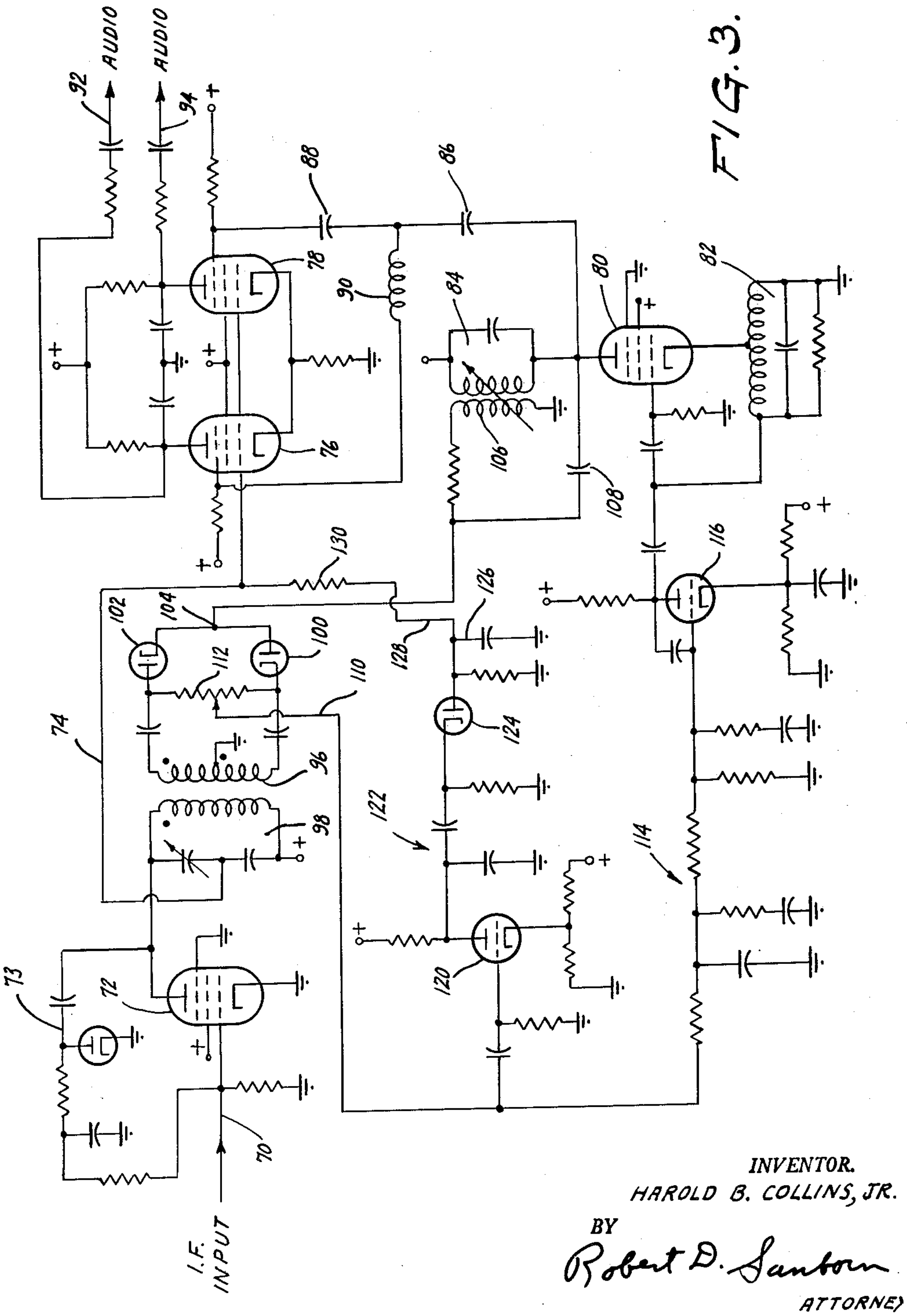
FIG. 3 is a schematic drawing of a portion of a receiver circuit which is generally of the type shown in FIG. 1.

A detailed explanation of the operation of phase comparator circuit 34 and frequency control 38 will be deferred until the circuit of FIG. 3 has been described.

The squelch circuit of FIG. 2 operates in the following manner. As the receiver of FIG. 2 is tuned from one station to another there is no signal from intermediate frequency amplifier 16 and hence oscillator 22 is not locked in frequency and phase and may drift. When a station is tuned in, there may be a slight difference in the frequency of oscillator 22 and the frequency of the signal supplied by amplifier 16. If this is so, the output signals of synchronous detectors 18 and 20 will include a component at the beat frequency. As the frequency of oscillator 22 approaches its proper value, this beat frequency will lie in the audio range and, unless steps are taken to suppress it, it will be heard as an undesirable squeal from the audio reproducers 30 and 32. A corresponding beat frequency signal will also appear at the output of phase comparator 34. The beat signal in the output of phase comparator 34 is detected by peak detector 36 and is supplied as a bias signal to reproducers 30 and 32 to turn these reproducers off. A bandpass filter 60 is inserted between phase comparator 34 and peak detector 62 to prevent the peak detector circuit 62 from detecting any signal at the fundamental or harmonics of the intermediate frequency carrier frequency which may appear at the output of the phase comparator during the normal operation of the circuit. The bandpass filter 60 also blocks the D.C. control signal which appears at the output of phase comparator 34 during the normal operation of the circuit. Preferably filter 60 will pass all frequencies which can be heard by the listener and which would produce an undesirable squeal in the output of the audio reproducers 30 and 32. Therefore the squelch circuit is operative only during the locking-in operation and is effectively out of the circuit once normal operating conditions are attained.

FIG. 3 is a schematic diagram of a portion of a receiver which is identical to that of FIG. 2 except that the squelch circuit is connected to the synchronous detectors 18 and 20 rather than to the audio reproducers 30 and 32. In FIG. 3 the intermediate frequency signal is supplied by way of lead 70 to an intermediate frequency amplifier stage 72. Stage 72 is provided with a conventional automatic volume control loop 73. The amplified intermediate frequency signal is supplied by way of connection 74 to the control grids of two synchronous detectors 76 and 78.

The reference oscillator circuit of FIG. 3 includes tube 80, tank circuit 82 and tuned anode load circuit 84. The signal from the anode of tube 80 is supplied to the suppressor grid of tube 78 by way of the capacitive network 86 and 88. The reference signal from the anode of tube 80 is supplied to suppressor grid of the other synchronous detector tube 76 by way of capacitor 86 and inductor 90. The phase shift characteristics of these two paths are such that the signal at the suppressor grid of tube 78 is 90° out of phase with the signal at the suppressor grid of tube 76. The detected audio signals appear at the anodes of tubes 76 and 78 and may be supplied by way of output leads 92 and 94 to the audio reproducers.

The phase comparator circuit of FIG. 3 comprises the center tapped secondary winding 96 which is coupled to the anode load impedance 98 of the IF amplifier tube 72. This phase comparator circuit also includes diode detector tubes 100 and 102. The polarity of the signal supplied by secondary 96 is indicated in conventional fashion by means of dots adjacent the two halves of the primary winding 96. The signal from the reference oscillator is supplied between point 104 and ground. The coupling from the reference oscillator to the phase detector is through a variable phasing circuit comprising a secondary winding 106 coupled to the tuned anode load 84 of reference oscillator tube 80. Coupling is further provided by a capacitor 108 which connects the anode of tube 80 directly to point 104. By varying the coupling between secondary winding 106 and its associated primary winding in the load circuit 84 the resultant phase of the signal supplied to point 104 may be adjusted. The purpose of this adjustment is to place the signal supplied to the suppressor grids of tubes 76 and 78 in proper phase with respect to the component carrier signals in the IF signal supplied to the control grids of tubes 76 and 78.

An output signal is taken from the phase comparator circuit by way of lead 110 which connects with a tap on load resistor 112. This signal is supplied through a low pass filter 114 to the control grid of a reactance tube 116. Filter 114 is a multiple time constant circuit having relatively high gain for low frequency signals and then dropping off sharply for higher frequency signals. The high gain for low frequency signals permits the phase comparator circuit to have a relatively wide pull-in range and the sharper cut-off for the higher frequency signals tends to make the circuit immune to noise impulses which might upset the synchronization between the IF signal and the reference oscillator. The reactance tube 116 is a conventional variable impedance circuit consisting of a triode with a large capacitive coupling between the anode and the control grid. Changes in the potential of the control grid will cause the apparent reactance between the anode and ground to change. This reactance is in shunt with the tank circuit 82 of the oscillator and hence controls the frequency and phase of the signal generated by the oscillator circuit 80—82—84.

The squelch circuit of FIG. 3 comprises an amplifier stage 120 which is energized from output lead 110 of the phase comparator. The output signal from amplifier 120 is passed through a bandpass circuit 122 to a diode detector 124. Detector tube 124 is provided with a parallel RC load circuit 126. The polarity of detection is such that a signal passed by bandpass circuit 122 will produce a negative signal on output lead 128 of the squelch circuit. This signal is supplied by way of isolating resistor 130 to the control grids of electron tubes 76 and 78.

The operation of FIG. 3 is believed to be obvious from the foregoing description. As the receiver in which this circuit is incorporated is tuned to a station the intermediate frequency signal supplied by way of input lead 70 and amplifier 72 to the phase comparator circuit beats with the signal from the reference oscillator 80 and produces an oscillatory signal on lead 110. If this signal is in the audio range it is passed by bandpass filter 122 and detected in circuit 124—126. The detected signal biases synchronous detector tubes 76 and 78 to the off condition so that no audio signal appears from the output leads 92 and 94. Once the receiver has been properly tuned the beat frequency signal will be low enough to be passed by low pass filter 114. The signal passed by filter 114, acting through the reactance tube 116, will servo the frequency of oscillator 80 to the average carrier frequency of the incoming signal. As the oscillator 80 locks on the incoming signal in frequency and phase, the signal on output lead 110 will include only a direct current component which will not be passed by bandpass filter 122. As a result the cut-off bias is removed from tubes 76 and 78. The signal on the control grids of these tubes is combined with the reference signal on the suppressor grids to provide the demodulated audio output signals which are supplied to leads 92 and 94. It should be noted that the circuits shown in FIGS. 1, 2 and 3 do not require any narrow band filters for carrier extraction. The only filter required in the phase locking circuit is the low pass filter 114 which is inexpensive to construct and which does not need to be critically tuned. The elimination of critically tuned carrier filters makes the receiver circuit inexpensive to manufacture, stable in operation and easy to tune.

Figure 4:
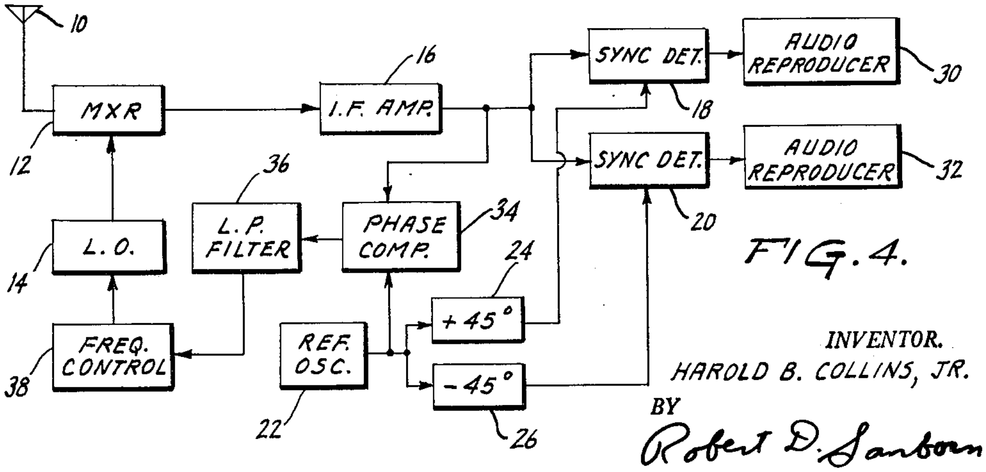
FIG. 4 is a block diagram of still another preferred embodiment of the invention in which the frequency control is supplied to the local oscillator rather than the reference phase oscillator.

The embodiment of the invention shown in FIG. 4 differs from the embodiment shown in FIG. 1 in that the output of the frequency control 38 is connected to local oscillator 14 rather than to the reference oscillator 22. The blocks shown in FIG. 4 corresponding to similar blocks in FIG. 1 have been given the same reference numerals. Local oscillator 14 is provided with the usual manual frequency control in addition to the frequency control supplied by block 38. The operation of the embodiment shown in FIG. 4 is similar to that of FIG. 1 except that the signal appearing at the output of intermediate frequency amplifier 16 is servoed to correspond to that of the reference oscillator. This is accomplished by changing the phase and frequency of the local oscillator signal which is heterodyned with the incoming radio frequency signal.

It has been assumed in describing the operation of the circuits of FIGS. 1–4 that the two component carrier signals 40 and 42 are 90° apart in phase. As explained in the copending application of Harold B. Collins, Jr. and Deril T. Webb, Serial No. 768,386, filed October 20, 1958, certain advantages are obtained by employing angles of less than 90° between these carrier signals. The circuits shown in FIGS. 1–4 will receive a modulated signal having component carriers spaced apart by less than 90° provided phase shifters 24 and 26 and phase control circuit 106 and 108 of FIG. 3 are adjusted so that the reference signal supplied to one synchronous detector is in phase quadrature with one reference carrier signal and the reference signal supplied to the other synchronous detector is in phase quadrature with the other reference carrier signal.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

I claim:

1. In a superheterodyne receiver for amplitude modulated, single carrier, stereophonic program signals, said receiver including a heterodyne mixer, a local oscillation generator coupled to said mixer for supplying a local oscillation signal thereto, said heterodyne mixer providing a signal modulated output signal which includes intermediate frequency information signals, first and second synchronous detectors receiving intermediate frequency information signals derived from said output signal of said heterodyne mixer, means including a reference signal generator which provides a reference output signal for supplying differently phased demodulating reference signals to said two synchronous detectors, means separate from said two synchronous detectors and responsive to said signal modulated output signal of said heterodyne mixer and said output signal of said reference signal generator for generating a frequency control signal indicative of the instantaneous phase difference between the average carrier component at the output of said heterodyne mixer and the ouput signal of said reference signal generator, and means coupled to one of said generators and responsive to said frequency control signal for maintaining said instantaneous phase difference at a preselected value.

2. A superheterodyne receiver as in claim 1 wherein siad last-mentioned means is coupled to said reference signal generator.

3. A superheterodyne receiver as in claim 1 wherein said last-mentioned means is coupled to said local oscillation generator.

4. In a superheterodyne receiver for amplitude modulated, single carrier, stereophonic program signals, said receiver including a heterodyne mixer, a local oscillation generator coupled to said mixer for supplying a local oscillation signal thereto, said heterodyne mixer providing a signal modulated output signal which includes intermediate frequency information signals, first and second synchronous detectors receiving intermediate frequency information signals derived from said signal modulated output signal of said heterodyne mixer, means including a reference signal generator which supplies a reference output signal for supplying quadrature phased demodulating reference signals to said two synchronous detectors, means separate from said two synchronous detectors and responsive to said signal modulated output signal of said heterodyne mixer and said output signal of said reference signal generator for providing a control signal which is indicative of the relative phases of the resultant carrier component in the output signal of said heterodyne mixer and the output signal of said reference signal generator, and means coupled to one of said generators and responsive to said control signal for maintaining a preselected instantaneous phase difference between said resultant carrier component in said signal modulated output signal of said heterodyne mixer and the output signal of said reference generator.

5. In a superheterodyne receiver for amplitude modulated, single carrier, stereophonic program signals, said receiver including a heterodyne mixer, a local oscillation generator coupled to said mixer for supplying a local oscillation signal thereto, said heterodyne mixer providing a signal modulated output signal which includes intermediate frequency information signals, first and second synchronous detectors receiving intermediate frequency information signals derived from said output signal of said heterodyne mixer and providing separate demodulated output signals, first and second audio reproducers deriving input signals from the output signals of said first and second synchronous detectors, respectively, means including a reference signal generator which provides a reference output signal for supplying quadrature phased demodulating reference signals to said two synchronous detectors, a phase comparator means separate from said two synchronous detectors, said phase comparator means having first and second inputs, means coupling said first input to the output of said heterodyne mixer, means coupling said second input to the output of said reference signal generator, signal responsive frequency control means associated with said reference oscillator for controlling the frequency and phase of the signal generated thereby, and a low pass filter circuit connecting the output of said phase comparator means to the signal input of said frequency control means.

6. A superheterodyne receiver as in claim 5 wherein said low pass filter has a relatively sharp cut-off characteristic.

7. A superheterodyne receiver as in claim 5, said receiver further comprising a peak detector circuit, an audio frequency bandpass filter coupling the input of said peak detector circuit to the output of said phase comparator circuit and means responsive to the presence of an output signal from said peak detector circuit for blocking the signals supplied to said audio reproducers at a point following said heterodyne mixer.

8. In a superheterodyne receiver for amplitude modulated, single carrier, stereophonic program signals, said receiver including a phase comparator circuit, first and second synchronous detectors, and a reference oscillator circuit providing a reference output signal, means coupled to the output of said reference oscillator circuit for supplying said reference output signal from said reference oscillator circuit to said phase comparator circuit and said first and second synchronous detectors in a predetermined phase relationship, said last-mentioned means comprising a first signal coupling path comprising first and second serially connected capacitors connecting the output of said reference oscillator circuit to an input of one of said synchronous detectors, a second signal coupling path comprising said first capacitor and an inductor connected in series circuit between the output of said reference oscillator circuit and an input of said second synchronous detector and means including a capacitive path and an inductive path connected in shunt combination connecting the output of said reference oscillator circuit to said phase comparator circuit, at least one of said two shunt connected paths being variable to vary the phase of the signals supplied to said signal comparator circuit.

9. In a superheterodyne receiver for amplitude modulated, single carrier, stereophonic program signals, said receiver including a heterodyne mixer, a local oscillation generator coupled to said mixer for supplying local oscillation signals thereto, said heterodyne mixer providing a signal modulated output signal which includes intermediate frequency information signals, first and second synchronous detectors receiving intermediate frequency information signals derived from said output signal of said heterodyne mixer, said synchronous detectors each including a pentode electron tube in which the signal derived from said heterodyne mixer is supplied to the control grid thereof, means including a reference signal generator which provides a reference output signal for supplying differently phased demodulating reference signals to the suppressor grid of each of said two pentode electron tubes, a phase comparator circuit receiving one input signal from the output of said reference signal generator and a second input signal derived from said output signal of said heterodyne mixer, and means for suppressing audio beat notes between the average carrier component in the output signal of said heterodyne mixer and the signal supplied by said reference signal generator, said last-mentioned means comprising a peak detector circuit, means including a bandpass filter circuit coupling the input of said peak detector circuit to the output of said phase comparator circuit, and means connecting the output of said peak detector circuit to said control grid of said first and second pentode tubes, respectively, the signal generated by said peak detector in response to a signal passed by said bandpass filter having a polarity such as to cut off said first and second pentode tubes.

10. A superheterodyne receiver for amplitude modulated, single carrier, stereophonic program signals, said receiver comprising a heterodyne mixer, a local oscillator coupled to said mixer for supplying a local oscillation signal thereto, first and second synchronous detectors each provided with a carrier wave input, a signal input and an output, bandpass signal coupling means coupling the output of said heterodyne mixer to said signal inputs of said first and second synchronous detectors, first and second audio reproducing circuits coupled to said outputs of said first and second synchronous detectors, respectively, a reference signal generator, means coupling the output of said reference signal generator to said carrier wave inputs of said first and second synchronous detectors, respectively, said last-mentioned means causing the signals supplied by said reference signal generator to said first and second synchronous detectors to be in quadrature phase at said carrier wave inputs of said synchronous detectors, phase comparator means separate from said two synchronous detectors, means coupling the output of said reference signal generator to one input of said phase comparator means, means coupling the output of said heterodyne mixer to a second input of said phase comparator means, signal responsive frequency control means coupled to said reference signal generator for controlling the frequency and phase of the signal generated thereby, a low-pass filter circuit coupling the output of said phase comparator means to the input of said control means, a peak detector circuit, a bandpass circuit coupling the output of said phase comparator circuit to the input of said peak detector circuit, and means responsive to the presence of an output signal from said peak detector circuit and coupled to points in said superheterodyne receiver following said heterodyne mixer for suppressing the output signals of said audio reproducers.

11. A superheterodyne receiver as in claim 10 wherein said last-mentioned means is coupled to said audio reproducers for rendering said audio reproducers inoperative.

12. A superheterodyne receiver as in claim 10 wherein said last-mentioned means is coupled to said first and second synchronous detectors, respectively, to render the said synchronous detectors inoperative.

References Cited in the file of this patent

UNITED STATES PATENTS

| | | |
|---|---|---|
| 2,100,236 | Brown | Nov. 23, 1937 |
| 2,611,036 | Norgaard | Sept. 16, 1952 |
| 2,619,547 | Ross | Nov. 25, 1952 |
| 2,760,132 | Pawley | Aug. 21, 1956 |
| 2,801,336 | Neeteson | July 30, 1957 |
| 2,808,508 | Sinninger | Oct. 1, 1957 |
| 2,852,763 | Westcott | Sept. 16, 1958 |

OTHER REFERENCES

RCA Service Data, 1955 No. T-5, 2nd Edition, 1st printing December 9, 1955.